(12) United States Patent
Walker et al.

(10) Patent No.: US 9,267,335 B2
(45) Date of Patent: Feb. 23, 2016

(54) BREECH LOCK COUPLING

(75) Inventors: Stephen John Walker, Houston, TX (US); David J. McWhorter, Magnolia, TX (US)

(73) Assignee: Cameron International Corporation, Houston, TX (US)

(*) Notice: Subject to any disclaimer, the term of this patent is extended or adjusted under 35 U.S.C. 154(b) by 908 days.

(21) Appl. No.: 12/933,861

(22) PCT Filed: Apr. 17, 2009

(86) PCT No.: PCT/US2009/041003
§ 371 (c)(1),
(2), (4) Date: Sep. 21, 2010

(87) PCT Pub. No.: WO2009/140027
PCT Pub. Date: Nov. 19, 2009

(65) Prior Publication Data
US 2011/0037257 A1    Feb. 17, 2011

Related U.S. Application Data

(60) Provisional application No. 61/053,579, filed on May 15, 2008.

(51) Int. Cl.
*F16L 21/02* (2006.01)
*E21B 17/01* (2006.01)

(52) U.S. Cl.
CPC ..................... *E21B 17/01* (2013.01)

(58) Field of Classification Search
CPC .................................................. E21B 17/085
USPC ........... 285/367, 420, 81, 330, 373, 403, 419; 405/167, 170, 224.3
See application file for complete search history.

(56) References Cited

U.S. PATENT DOCUMENTS 1,535,294 A * 4/1925 Collins ..................... 285/412
1,691,851 A * 11/1928 McCuean ..................... 285/81

(Continued)

FOREIGN PATENT DOCUMENTS

| EP | 0158455 | 10/1985 |
|---|---|---|
| EP | 1589188 | 10/2005 |
| GB | 2027150 | 2/1980 |

OTHER PUBLICATIONS

International Search Report & Written Opinion of PCT/US2009/041003 dated Sep. 18, 2009.

*Primary Examiner* — Aaron Dunwoody
*Assistant Examiner* — Fannie Kee
(74) *Attorney, Agent, or Firm* — Fletcher Yoder P.C.

(57) ABSTRACT

There is provided a breech lock coupling for coupling riser sections together. The breech lock coupling may be used non-pre-loaded or pre-loaded according to the user's preferences. In addition, the breech lock coupling may be disassembled for inspection and maintenance and reassembled. A locking ring secures two coupling components together. The coupling components may be attached to opposite ends of the riser sections, such as via welding. The locking ring may be pre-attached to the first coupling component for easy storage and fast assembly. Assembly of the riser may be accomplished by inserting the second coupling component into the locking ring and the first coupling component, then rotating the locking ring with respect to the second component. Furthermore, the coupling may be pre-loaded by tightening fasteners on the locking ring to provide a more stable coupling. Unlike with traditional riser couplings, the pre-load fasteners may be tightened via hand-held tools.

38 Claims, 6 Drawing Sheets

(56) References Cited

U.S. PATENT DOCUMENTS

| | | | | |
|---|---|---|---|---|
| 1,992,503 A | * | 2/1935 | Penick et al. | 285/336 |
| 2,112,519 A | * | 3/1938 | Clo | 137/231 |
| 2,318,590 A | * | 5/1943 | Boynton | 285/81 |
| 2,473,102 A | * | 6/1949 | Krooss | 285/112 |
| 2,818,055 A | * | 12/1957 | Hovde | 92/169.1 |
| 3,620,554 A | * | 11/1971 | Ward et al. | 285/18 |
| 3,827,728 A | * | 8/1974 | Hynes | 285/90 |
| 4,043,575 A | | 8/1977 | Roth | |
| 4,097,069 A | * | 6/1978 | Morrill | 285/84 |
| 4,108,479 A | * | 8/1978 | Straub | 285/112 |
| 4,165,891 A | | 8/1979 | Knox et al. | |
| 4,280,719 A | * | 7/1981 | Daniel et al. | 285/90 |
| 4,281,863 A | * | 8/1981 | Hall | 285/382.2 |
| 4,330,140 A | * | 5/1982 | Hampton | 285/90 |
| 4,487,434 A | * | 12/1984 | Roche | 285/93 |
| 4,496,173 A | * | 1/1985 | Roche et al. | 285/24 |
| 4,647,254 A | * | 3/1987 | Baugh et al. | 405/169 |
| 4,801,160 A | * | 1/1989 | Barrington | 285/81 |
| 4,898,407 A | * | 2/1990 | Zeidler | 285/328 |
| 5,590,913 A | * | 1/1997 | Morris et al. | 285/18 |
| 5,911,446 A | * | 6/1999 | McLennan et al. | 285/104 |
| 6,170,884 B1 | * | 1/2001 | McLennan et al. | 285/112 |
| 7,341,281 B2 | | 3/2008 | Guesnon et al. | |
| 2004/0113426 A1 | * | 6/2004 | Milberger et al. | 285/330 |
| 2005/0206163 A1 | * | 9/2005 | Guesnon et al. | 285/402 |
| 2010/0164223 A1 | * | 7/2010 | Curtiss et al. | 285/24 |

* cited by examiner

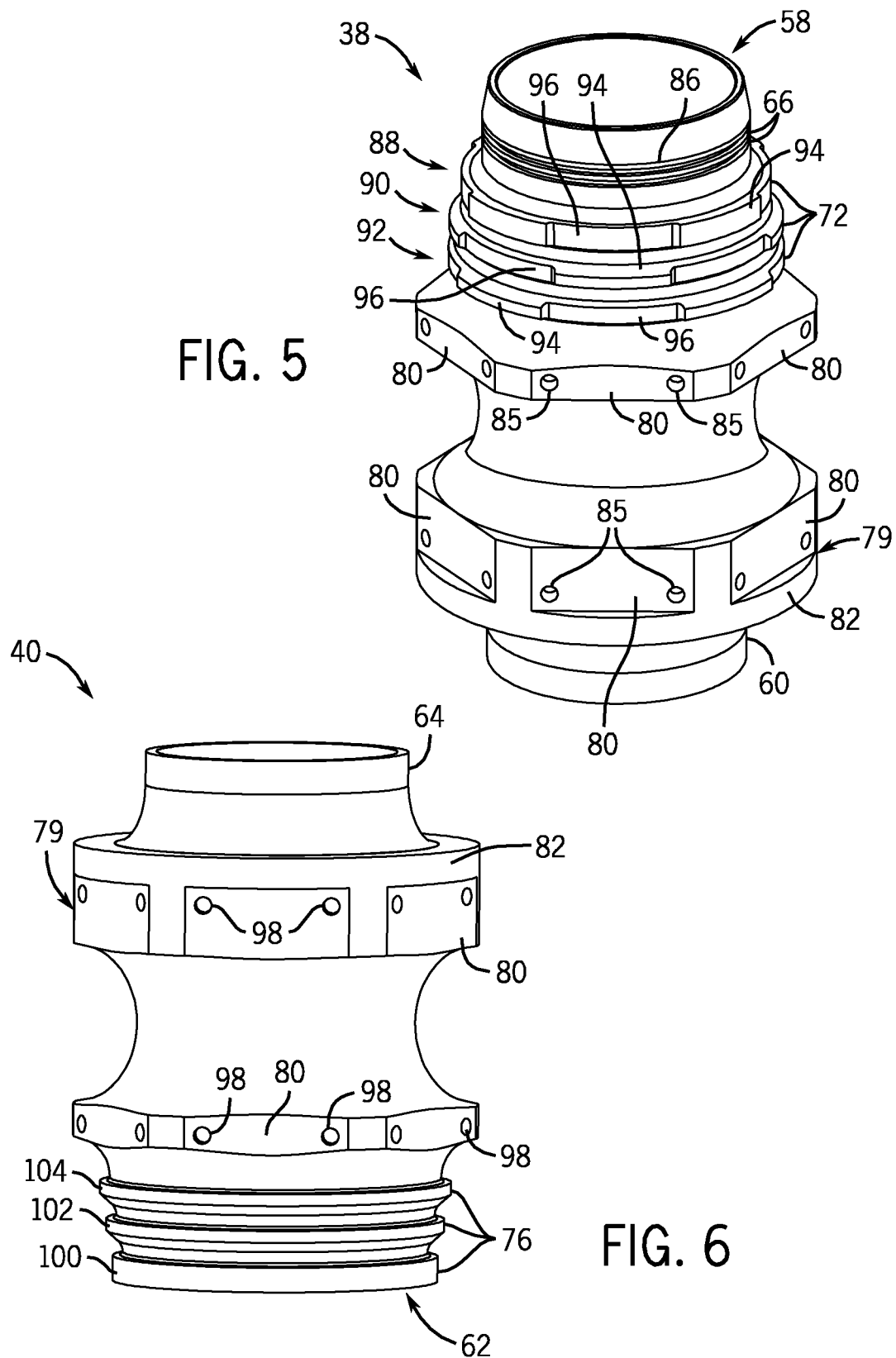

BREECH LOCK COUPLING

CROSS REFERENCE TO RELATED APPLICATION

This application claims priority to PCT Application No. PCT/US2009/041003 entitled "Breech Lock Coupling", filed on Apr. 17, 2009, which is herein incorporated by reference in its entirety, and which claims priority to U.S. Provisional Patent Application No. 61/053,579, entitled "Breech Lock Coupling", filed on May 15, 2008, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are used as fuel to power vehicles, heat homes, and generate electricity, in addition to a myriad of other uses. Once a desired resource is discovered below the surface of the earth, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components and/or conduits, such as casings, trees, manifolds, and the like, that facilitate drilling and/or extraction operations.

When drilling for minerals, a drilling riser may be employed to convey drilling mud to a drill bit (e.g., for lubrication) and to convey the mud returns and drilling debris up from a bore hole. For example, a drill pipe carrying drilling mud from the surface to the drill bit may be disposed within the riser. Mud returns may travel back up the riser in the annular region between the drill pipe and the riser wall. The mud returns may also carry displaced rock away from the bore hole. Various other pipes may be disposed about the riser. For example, one or more choke/kill lines, mud boost lines, hydraulic lines, and so forth may be externally coupled to the riser. The riser may, in turn, be disposed within other tubing to protect the pipes from damage.

The riser generally consists of many sections coupled together. In some systems, the sections include couplings to connect the ends of the riser sections together. Current couplings generally include circular flanges disposed axially adjacent one another at the ends of the riser sections. The circular flanges are coupled together by bolts, which are tightened to couple the flanges axially together and to pre-load the couplings to mitigate fatigue due to load oscillations during use, for instance. Tightening the bolts is relatively time-consuming, taking over two minutes per coupling, and generally requires heavy machinery to provide adequate pre-load on the flange coupling.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 5 is a perspective view of a pin portion of the breech lock coupling of FIG. 3;

FIG. 6 is a perspective view of a box portion of the breech lock coupling of FIG. 3.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed below, embodiments of the present invention provide a breech lock coupling which enables fast and easy coupling of riser sections. For example, the breech lock coupling may include a locking ring to couple riser sections together without the requirement of a pre-load. In addition, the breech lock coupling may acquire a pre-load by tightening the locking ring via a plurality of fasteners. The fasteners may be tightened by handheld equipment, thereby eliminating the need for heavy equipment to pre-load the riser couplings. In certain embodiments, the locking ring is completely removable, such that the coupling components may be easily inspected for fatigue. Furthermore, one or more external line connectors may be disposed about the breech lock coupling to enable load-sharing with the riser tube.

Figure 1:
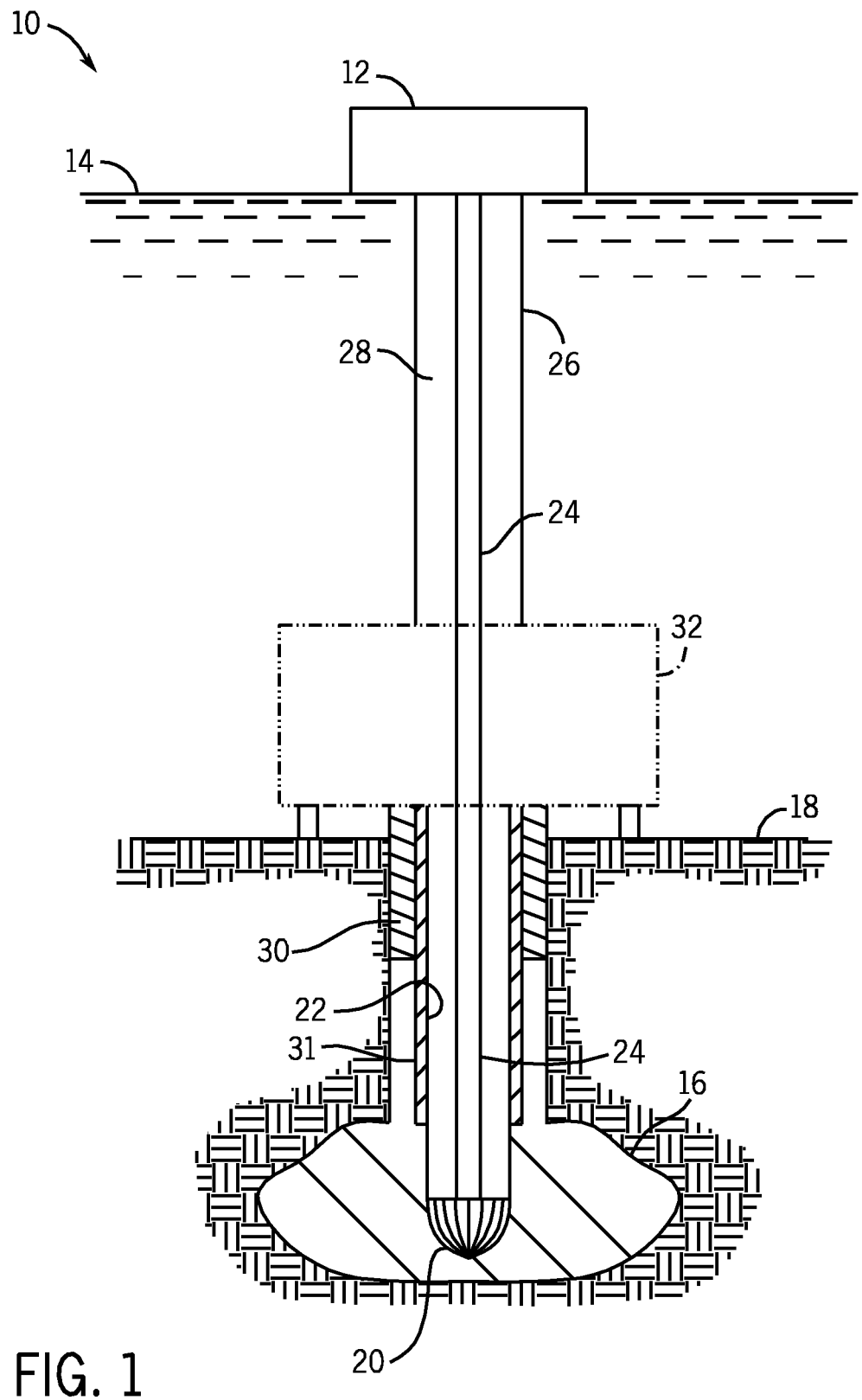
FIG. 1 is a diagram of an embodiment of a mineral extraction system.

Turning to FIG. 1, a schematic illustration provides a general overview of a mineral extraction system 10 in accordance with certain embodiments. A drilling rig 12 on a surface 14 (e.g., the ocean surface) is used to extract minerals, such as oil, gas, and natural gas, from a mineral deposit 16 located below ground 18 (e.g., the sea floor). To enable this extraction, a drill bit 20 is lowered from the drilling rig 12 to the ground 18, and a hole 22 (i.e., wellbore) is bored down to the mineral deposit 16. A drill pipe 24 supplies drilling mud from the drilling rig 12 to the drill bit 20 to lubricate the bit 20. The drilling mud also picks up debris displaced by the drill bit 20 and carries these returns back up to the drilling rig 12 through various tubing including a riser 26. The riser 26 may be situated around the drill pipe 24 such that the mud returns travel up the riser 26 through an annular portion 28 between the drill pipe 24 and the riser 26. One or more external pipes may be disposed about the riser 26 to carry additional fluids from the drilling rig 12, as described below.

The mineral extraction system 10 also includes a wellhead 30 disposed in the ground 18, an annular tube 31 (e.g., casing) disposed in the wellhead 30 and the hole 22 in the ground 18, and a stack 32 disposed above the ground 18. The annular tube 31 provides sidewall support in the hole 22 during drilling and extraction operations. The annular tube 31 also may provide protection and/or define additional annular passages, for example, for other lines or tubing. The stack 32 may include various control, drilling, and extraction equipment, such as, for example, a Christmas tree, a blowout preventer, a tubing hanger, a casing hanger, hydraulic control valves, and so forth. For example, in the illustrated embodiment, the stack 32 may represent a blowout preventer (BOP) stack.

Figure 2:
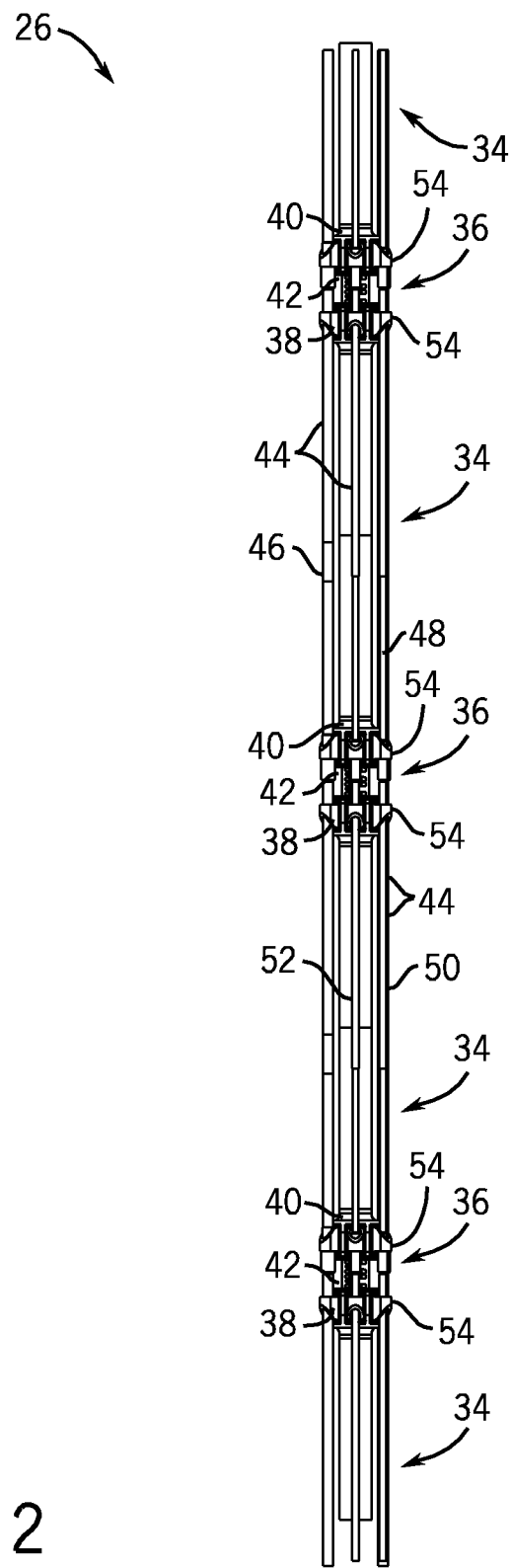
FIG. 2 is a perspective view of an embodiment of a riser for use in the mineral extraction system of FIG. 1.
Figure 3:
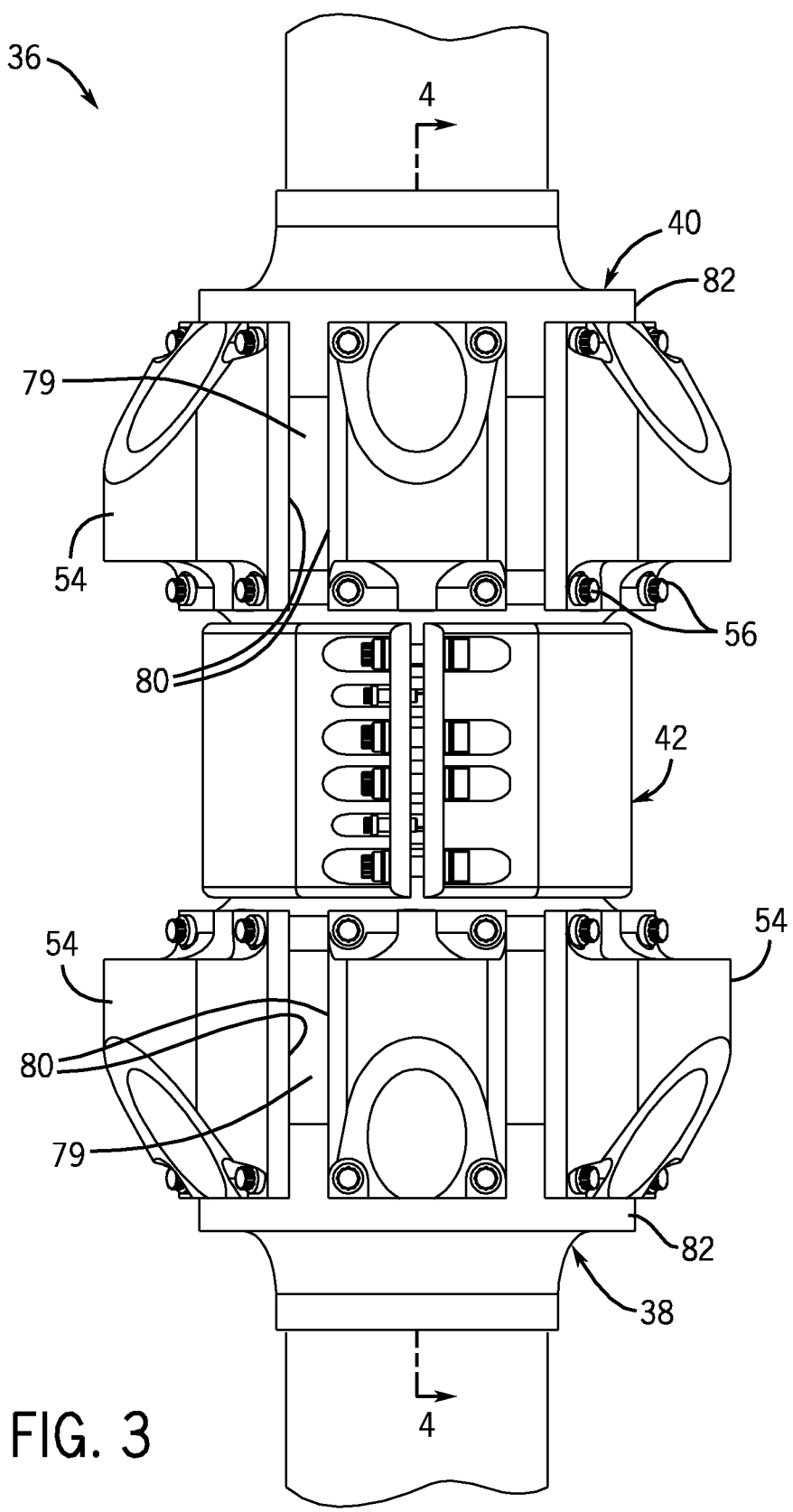
FIG. 3 is a perspective view of an embodiment of a breech lock coupling for coupling together the riser sections of FIG. 2.

FIG. 2 illustrates an embodiment of the riser 26 in more detail. Many riser sections 34 are often joined together to form the riser 26. A breech lock coupling 36, further illustrated in FIG. 3, is believed to enable fast and easy coupling of the riser sections 34 during installation of the riser 26. For example, the illustrated breech lock coupling 36 includes a pin portion 38 and a box portion 40 held together by a locking ring 42. Referring to both FIGS. 2 and 3, each riser section 34 has the pin portion 38 at one end and the box portion 40 at the other end. For example, the pin and box portions 38 and 40 may be welded to opposite ends of each riser section 34. When the pin portion 38 from one riser section 34 is joined with the box portion 40 of another riser section 34, the locking ring 42 may then be engaged to secure the joint, as described in more detail below.

As further illustrated in FIG. 2, one or more external tubes 44 may be disposed about the riser 26. For example, a choke line 46 may run alongside the riser 26 to enable depressurization of the well fluids. A kill line 48 may provide pressurized fluid to the stack 32 (FIG. 1) in the event that flow from the well needs to be terminated. In addition, a mud boost line 50 may be provided alongside the riser 26. The mud boost line 50 may supply additional drilling mud to the riser 26 above the drill bit 20 (FIG. 1). This additional mud increases the velocity of the mud returns, thereby reducing the settling-out of drilling debris from the mud returns. Other fluid lines, such as hydraulic fluid lines 52, may run alongside the riser 26 to provide various fluids to the stack 32 (FIG. 1). In the illustrated embodiment, the external tubes 44 may also provide additional support for the riser 26. That is, due to the design of the breech lock coupling 36, the load on the riser 26 resulting from the weight of the riser 26 and components attached thereto is believed to be distributed, or shared, between the riser 26 and the external tubes 44.

The external tubes 44 may be coupled to the riser 26 via supports 54 disposed about the breech lock couplings 36. For example, at the ends of each riser section 34, the tubes 44 are secured to the pin portion 38 and/or the box portion 40 of the breech lock couplings 36 via supports 54, as illustrated in FIG. 3. The illustrated supports 54 are secured to the coupling portions 38 and 40 via fasteners 56 (e.g., bolts). In addition, clamps (not shown) may secure the tubes 44 to the riser sections 34 between the ends.

Figure 4:
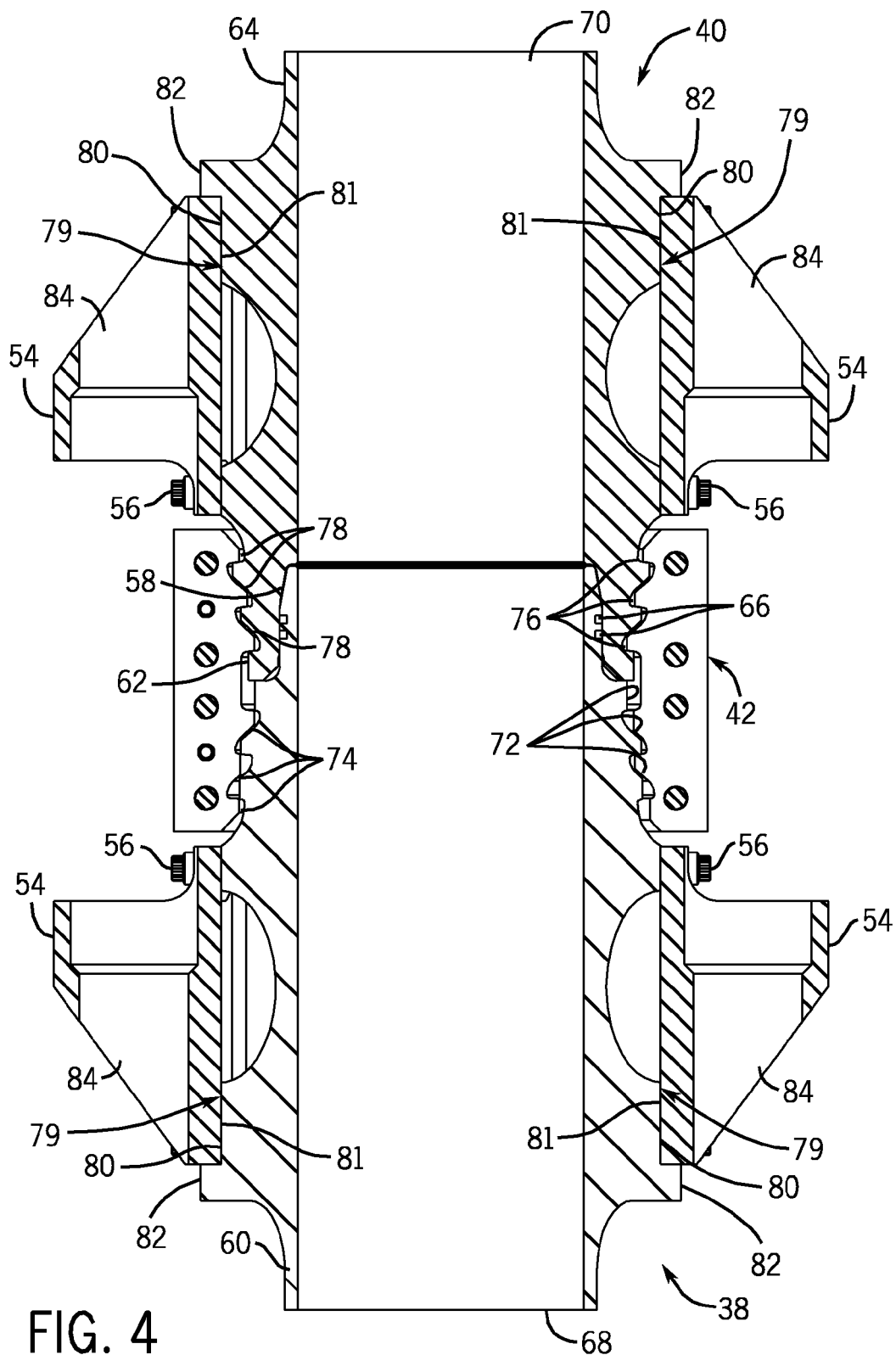
FIG. 4 is a cross-sectional view of the breech lock coupling of FIG. 3 taken along line 4-4.

FIG. 4 is a cross-section of the breech lock coupling 36 of FIG. 3 taken along a line 4-4, in accordance with certain embodiments. The pin portion 38 of the coupling 36 includes a coupling end 58 and a pipe end 60. The pipe end 60 may be inserted into and welded to a riser section 34 (FIG. 2). Similarly, the box portion 40 of the coupling 36 includes a coupling end 62 and a pipe end 64. The pipe end 64 also may be inserted into and welded to a riser section 34 (FIG. 2). The coupling ends 58 and 62 are fitted together by advancing the pin portion 38 into the box portion 40. One or more seals 66 (e.g., ring seals) may be disposed about the coupling end 58 of the pin portion 38 to enable a fluid-tight fit between the coupling portions 38 and 40. As discussed above, fluid, such as mud returns, flow through the breech lock coupling 36 via bores 68 and 70 in the pin portion 38 and the box portion 40, respectively.

Although the seals 66 may provide an interference fit between the pin portion 38 and the box portion 40, the locking ring 42 secures the two portions together. As illustrated in FIG. 4, the pin portion 38 includes rows of teeth 72 which protrude radially outward near the coupling end 58. Cooperating teeth 74 protrude radially inward from the coupling ring 42 to mate with the teeth 72. Similarly, the box portion 40 has rows of teeth 76 which protrude radially outward and cooperate with rows of teeth 78 protruding radially inward from the coupling ring 42. As will be described in more detail below, the cooperating teeth 72 and 74 may be different from the cooperating teeth 76 and 78.

In addition to securing riser sections 34 together, the breech lock coupling 36 serves to secure the external tubes 44 to the riser 26 (FIG. 2). The external tube supports 54 may be fastened to the pin portion 38 and the box portion 40 via the fasteners 56. Each support 54 may be secured to exterior surfaces 79 of the pin portion 38 and the box portion 40. In the illustrated embodiment, the exterior surfaces 79 include flat surfaces 80 to enable flush mounting with corresponding flat surfaces 81 of the external tube supports 54. In another embodiment, the surfaces 80 and 81 may be curved (e.g., part of cylindrical shape) rather than flat, such that the surfaces 80 and 81 are still configured to mount the external supports 54 flush with the exterior surfaces 79 of the pin portion 38 and the box portion 40. Additionally, the external tube supports 54 may be mounted to the exterior surfaces 79 without a flush mount. That is, the flat surfaces 81 on the external tube supports 54 may be secured to a curved exterior surface 79 of pin portion 38 and the box portion 40. Shoulders 82 on the pin portion 38 and the box portion 40 may enable load sharing between the external tubes 44 and the riser 26 (FIG. 2). For example, the external tube supports 54 abut the shoulders 82 such that axial forces are distributed among the pin portion 38, the box portion 40, the riser 26, and the external tubes 44. Thus, axial forces in the riser 26 can be shared among the various external tubes 44 via the engagement of the shoulders 82 with the external tube supports 54. Furthermore, each support 54 has a bore 84 running therethrough generally parallel to the bores 68 and 70 of the portions 38 and 40, respectively. The bores 84 may receive the external tubes 44 (FIG. 2).

Figure 7:
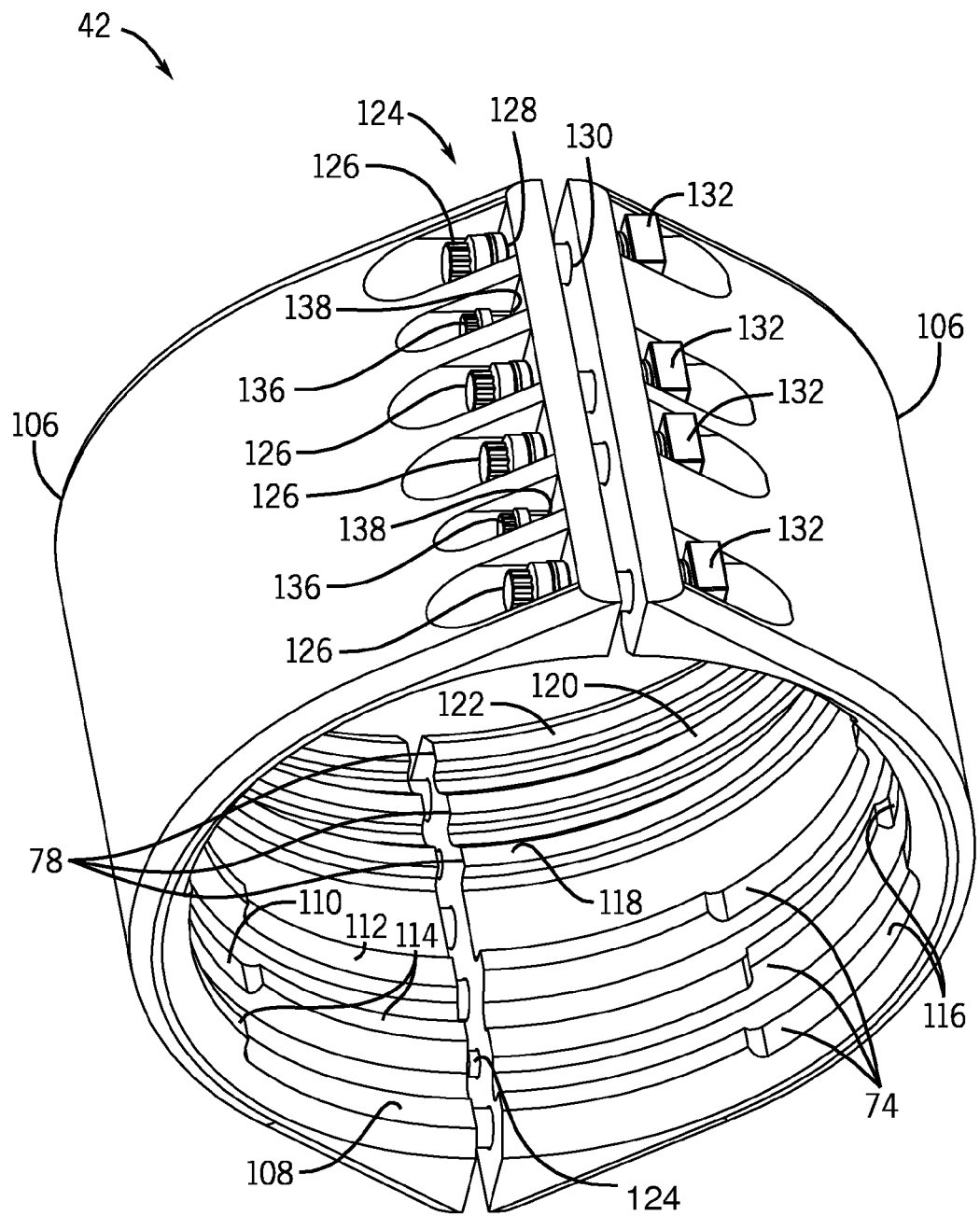
FIG. 7 is a perspective view of a locking ring of the breech lock coupling of FIG. 3.

Turning to FIGS. 5-7, embodiments of the components of the breech lock coupling 36 are individually illustrated in more detail. FIG. 5 illustrates the pin portion 38 of the coupling 36. The pin portion 38 has a generally cylindrical shape with the flat surfaces 80 optionally providing flush securement areas for the corresponding flat surfaces 81 of the external tube supports 54 (FIG. 3). Holes 85 (e.g., threaded holes) in the exterior surface 79 may receive the fasteners 56 to secure the supports 54 to the pin portion 38 (FIG. 3). As discussed above, the shoulder 82 enables load sharing between the riser 26 and the external tubes 44 (FIG. 2). The coupling end 58 of the pin portion 38 includes the seals 66 (e.g., ring seals). The seals 66 may be secured to the pin portion 38 via small insets 86. The insets 86 are shallow enough that the seals 66 may protrude radially outward to contact the interior of the box portion 40 (FIG. 3).

The teeth 72 which protrude radially outward from the pin portion 38 near the coupling end 58 are configured to removably interlock with the teeth 74 of the locking ring 42 (FIG. 3). To facilitate this interlocking function, the teeth 72 may include multiple rows of teeth 88, 90, and 92, each having one or more protrusions 94 and one or more indentations 96. The protrusions 94 and the indentations 96 on a given row 88, 90, or 92 may alternate around the circumference of the pin portion 38. In addition, the protrusions 94 and the indentations 96 may alternate from one row to the next (e.g., row 88 to row 90 or row 90 to row 92) to form a staggered pattern of protrusions 94 around the coupling end 58 of the pin portion 38.

Furthermore, the protrusions 94 and/or the rows 88, 90, and 92 may extend radially outward to different distances. For example, the row 88 (and the protrusions 94 thereon) may extend radially outward from the pin portion 38 to a lesser extent than the rows 90 and 92 (and the protrusions 94 thereon). Put another way, the maximum diameter of the row 88 (i.e., the distance from the outer surface of one protrusion 94 to the outer surface of an opposite protrusion 94 on the row 88) may be less than that of the rows 90 and/or 92. Similarly, the row 90 may have a smaller maximum diameter than the row 92. The rows 88, 90, and 92 may have similar minimum diameters (i.e., the distance from the outer surface of one indentation 96 to the outer surface of an opposite indentation 96), with only the radial height of the protrusions 94 on each row varying (e.g., the radial distance from the outer surface of the indentations 96 to the outer surface of the protrusions 94 on a given row 88, 90, or 92). In another embodiment, the protrusions 94 may have similar radial heights, with the rows 88, 90, and 92 having increasing minimum diameters. In yet another embodiment, the minimum diameters of the rows 88, 90, and 92 may vary along with the radial height of the protrusions 94.

Turning to FIG. 6, the box portion 40 of the breech lock coupling 36 has many features similar to that of the pin portion 38, in accordance with certain embodiments. The box portion 40 has a generally cylindrical shape. The coupling end 62 may receive the coupling end 58 of the pin portion 38 (FIG. 5). In addition, the exterior surface 79 may include holes 98 (e.g., threaded holes) to receive the fasteners 56 and secure the external tube supports 54 to the box portion 40 (FIG. 3). The optional flat surfaces 80 in the illustrated embodiment may provide flush securement areas for the corresponding flat surfaces 81 of the external tube supports 54 (FIG. 2). As discussed above, the shoulder 82 enables load sharing between the riser 26 and the external tubes 44 (FIG. 2).

The teeth 76 are configured to receive the teeth 78 on the locking ring 42 (FIG. 3). In contrast to the teeth 72 on the pin portion 38 (FIG. 5), the teeth 76 on the box portion 40 may be continuous protrusions (i.e., a complete generally circular geometry) extending radially outward from the coupling end 62. That is, each row 100, 102, and 104 may be uniform around the entire circumference of the box portion 40. The rows 100, 102, and 104 may extend radially outward to different extents relative to one another. That is, the diameter of the row 100 may be less than that of the row 102, which may be less than that of the row 104. This configuration facilitates attachment and removal of the locking ring 42, as described in more detail below.

The locking ring 42 is illustrated in more detail in FIG. 7. The ring 42 has a generally cylindrical shape made up by coupling together two ring portions 106 (i.e., not an entire circular or annular geometry). In one embodiment, the ring portions 106 may be identical or similar such that each ring 42 can be formed by coupling together any two ring portions 106. In another embodiment, the ring portions 106 may be complimentary but different such that one portion 106 is coupled to its complimentary portion 106 rather than an identical portion 106. In addition, the two ring portions 106 which make up the locking ring 42 may each be semicircular (i.e., 180 degrees), or one portion 106 may have a first arc length (i.e., less than 180 degrees) and the second portion 106 may have a second arc length (i.e., greater than 180 degrees), which collectively form a generally full 360 degree circle. In another embodiment, more than two ring portions 106 may be coupled together to form the circular locking ring 42 (e.g., three portions 106 each having arc lengths of 120 degrees, four portions 106 each having arc lengths of 90 degrees, one portion 106 having an arc length of 180 degrees and two portions 106 each having arc lengths of 90 degrees, etc.).

As discussed above, the teeth 74 and 78 enable connection of the ring 42 with the pin portion 38 and the box portion 40, respectively (FIG. 3). As with the teeth 72 (FIG. 5), the teeth 74 may include multiple rows of teeth 108, 110, and 112 extending radially inward from an internal surface of the ring 42. Each row 108, 110, and 112 may have one or more protrusions 114 and one or more indentations 116. The protrusions 114 and the indentations 116 on a given row 108, 110, or 112 may alternate around the inner circumference of the locking ring 42. In addition, the protrusions 114 and the indentations 116 may alternate from one row to the next (e.g., row 108 to row 110 or row 110 to row 112) to form a staggered pattern of protrusions 114 and indentations 116, as illustrated in FIG. 7.

Also, as with the teeth 72 (FIG. 5), the protrusions 114 and/or the rows 108, 110, and 112 may extend radially inward to different distances. For example, the row 108 (and the protrusions 114 thereon) may extend radially inward to a lesser extent than the rows 110 and 112 (and the protrusions 114 thereon). In this configuration, the minimum diameter of the row 108 (i.e., the distance from the inner surface of one protrusion 114 to the inner surface of an opposite protrusion 114 on the row 108) may be greater than that of the rows 110 and/or 112. Similarly, the row 110 may have a greater minimum diameter than the row 112. The rows 108, 110, and 112 may have similar maximum diameters (i.e., the distance from the inner surface of one indentation 116 to the inner surface of an opposite indentation 116), with only the radial height of the protrusions 114 on each row varying. In another embodiment, the protrusions 114 may have similar radial heights, with the rows 108, 110, and 112 having decreasing maximum diameters. In yet another embodiment, the maximum diameters of the rows 108, 110, and 112 may vary in addition to the radial height of the protrusions 114.

The teeth 78, like the teeth 76 (FIG. 6), may be continuous protrusions extending radially inward. For example, each row 118, 120, and 122 may be generally uniform around the entire inner circumference of the locking ring 42. The rows 118, 120, and 122 may extend radially inward to different distances relative to one another. That is, the diameter of the row 118 may be less than that of the row 120, which may be less than that of the row 122. In the illustrated embodiment, the locking ring 42 may be coupled to the box portion 40 of each riser section 34 prior to installation of the riser 26 (FIG. 2). By pre-assembling part of the breech lock coupling 36, the riser sections 36 may be coupled together faster and more efficiently. The teeth 76 and 78 may cooperate to secure the locking ring 42 to the box portion 40 while still enabling rotation of the ring 42 with respect to the box portion 40 (FIG. 6).

In addition, the teeth 74 may be configured to couple with the teeth 72 of the pin portion 38 (FIG. 5) via simple rotation of the locking ring 42 with respect to the pin portion 38. That is, the configuration of the teeth 72 and 74 may enable the teeth 74 to pass over the teeth 72 when in proper orientation relative to one another. The proper orientation may be, for example, such that the projections 114 on the row 108 are in line with the indentations 96 on the row 88 (FIGS. 5 and 7). The projections 114 on the rows 110 and 112 would also be in line with the indentations 96 on the rows 90 and 92, respectively. In addition, the indentations 116 on the rows 108, 110, and 112 would be in line with the projections 94 on the respective rows 88, 90, and 92. The rows 108, 110, and 112 may then be advanced just past the rows 88, 90, and 92, respectively. Because the locking ring 42 is pre-attached to the box portion 40, advancing the pin portion 38 into the locking ring 42 also serves to advance the pin portion 38 into the box portion 40.

Rotation of the locking ring 42 with respect to the pin portion 38 may then alter the orientation of the teeth 72 with respect to the teeth 74 such that the pin portion 38 may no longer be pulled axially out of the locking ring 42. For example, the projections 94 on the row 88 may be axially in line with the projections 114 on the row 108. Because the row 108 was advanced axially past the row 88, the projections 94 and 114 may stop the pin portion 38 and the locking ring 42 from being disengaged in an axial direction. Similarly, the projections 94 and 114 on the rows 90 and 110 and the rows 92 and 112, respectively, may further secure the pin portion 38 and the locking ring 42 together. The degree of rotation of the ring 42 required to lock the coupling 36 may be dependent on the configuration of the teeth 72 and 74. That is, the locking ring 42 needs to be rotated only to the degree that the projections 94 are aligned with the adjacent projections 114 such that the pin portion 38 may not be disengaged from the locking ring 42. This degree of rotation may be based on the number of projections 94 and 114 which are disposed about each row of teeth 72 and 74, respectively. For example, if the rows of teeth 72 and 74 each have four projections 94 and 114 and four indentations 96 and 116, respectively, as in the illustrated embodiment, the degree of rotation of the ring 42 with respect to the pin portion 38 required to lock the coupling 36 would be approximately 45 degrees. Similarly, if there are only two projections 94 and 114 and two indentations 96 and 116 on each of the rows of teeth 72 and 74, respectively, the ring 42 would be rotated 90 degrees with respect to the pin portion 38 to lock the coupling 36. A securement device (not shown) may hold the locking ring 42 in place relative to the pin portion 38 and the box portion 40 such that the riser coupling 36 may be used in the non-pre-loaded configuration.

As described, engagement of the locking ring 42 with the teeth 72 and 76 may secure the pin portion 38 and the box portion 40 together, but the coupling 36 is not pre-loaded. While the coupling 36 may be used in this manner, it may at times be desirable to pre-load the coupling 36 to reduce fatigue on the coupling 36 during use. Accordingly, the locking ring 42 may be tightened around the pin portion 38 and the box portion 40 via one or more fasteners 124. The fasteners 124 may be, for example, bolts which are passed tangentially or circumferentially through one ring portion 106 and engage threaded receptacles (not shown) in the other portion 106. In another embodiment, illustrated in FIG. 7, the fasteners may be bolts 126 which are passed through holes 128 in one ring portion 106 and corresponding holes 130 in the other ring portion 106 and are secured by nuts 132. The bolts 126 may be tightened to secure the locking ring 42 around the pin portion 38 and the box portion 40. The size and position of the bolts 126 enable tightening via a hand-held tool, thereby reducing the need for heavy equipment during installation of the riser 26 (FIG. 2).

By tightening the locking ring 42, the breech lock coupling 36 may be pre-loaded with a force roughly equal to the force with which the riser sections 34 are pulled apart during normal usage of the riser 26 (FIG. 2). In addition, the fasteners 124 may be disengaged to remove the locking ring 42 and inspect the components of the coupling 36 for fatigue or damage. The fasteners 124 may be disengaged and the ring 42 taken apart without disengaging the pin portion 38 from the box portion 40. Due to environmental wear (e.g., rust, deposits, etc.), the ring 42 may stick together even after removal of the fasteners 124. To facilitate removal of the ring 42, jack screws 136 may be disposed in holes 138 on one side of the ring portion 106. The opposite side of the ring portion 106 may not contain corresponding holes. The portions 106 may then be jacked apart by advancing the jack screws 136 into the holes 138, thereby pushing against the adjoined ring portion 106.

While the invention may be susceptible to various modifications and alternative forms, specific embodiments have been shown by way of example in the drawings and have been described in detail herein. However, it should be understood that the invention is not intended to be limited to the particular forms disclosed. For example, although in the embodiment described herein the locking ring 42 is pre-attached to the box portion 40, it should be understood that the coupling features may be reversed such that the locking ring 42 is pre-attached to the pin portion 38 and coupled to the box portion 40 via rotation. Indeed, the invention is to cover all modifications, equivalents, and alternatives falling within the spirit and scope of the invention as defined by the following appended claims.

The invention claimed is:

1. A system, comprising:
   a breech lock coupling, comprising:
   a removable locking ring configured to secure first and second coupling components together, wherein the removable locking ring comprises:
   first and second ring portions circumferentially spaced about an axis of the breech lock coupling; and
   a plurality of teeth configured to couple with a plurality of mating teeth of the first or second coupling component, wherein the plurality of teeth of the removable locking ring comprises a first row and a second row axially offset from one another relative to the axis, the first row comprises a first plurality of teeth spaced apart from one another circumferentially about the axis via a first plurality of indentions, the second row comprises a second plurality of teeth spaced apart from one another circumferentially about the axis via a second plurality of indentions, the first plurality of teeth circumferentially overlap with the second plurality of indentions, and the second plurality of teeth circumferentially overlap with the first plurality of indentions; and
   at least one fastener extending crosswise to the axis and coupling the first and second ring portions.

2. The system of claim 1, wherein the first plurality of teeth are axially aligned with the second plurality of indentions, and the second plurality of teeth are axially aligned with the first plurality of indentions.

3. The system of claim 1, wherein the first and second ring portions are substantially identical semi-circular ring portions.

4. The system of claim 1, wherein the first and second ring portions have different arc lengths that complement one another to complete a circular geometry of the removable locking ring.

5. The system of claim 1, comprising a jack component configured to assist in separation of the first and second ring portions.

6. The system of claim 1, comprising the first and second coupling components, wherein the first coupling component comprises a pin portion and the second coupling component comprises a box portion configured to receive the pin portion at least partially within the box portion.

7. The system of claim 6, comprising a seal between the first and second coupling components.

8. The system of claim 6, comprising a plurality of external tube supports coupled to the first and second coupling components, wherein the plurality of external tube supports is configured to support one or more external tubes lengthwise along a riser, and the plurality of external tube supports is configured to enable load sharing between the riser coupled together by the breech lock coupling and the one or more external tubes secured to the riser by the plurality of external tube supports.

9. The system of claim 1, wherein:
the removable locking ring comprises first and second coupling sections configured to couple the removable locking ring to the first and second coupling components, respectively; and
the first coupling section has a different configuration of teeth than the second coupling section, wherein the second coupling section comprises a plurality of rows of staggered teeth including the first and second rows of teeth.

10. The system of claim 9, wherein the first coupling section comprises a plurality of rows of continuous teeth, and each tooth of the plurality of rows of continuous teeth extends continuously around the axis to form a circular protrusion.

11. The system of claim 1, wherein the at least one fastener comprises a plurality of threaded fasteners extending crosswise to the axis between the first and second ring portions of the removable locking ring.

12. The system of claim 1, wherein:
the removable locking ring is configured to secure the first and second coupling components together without pre-loading the first and second coupling components with the removable locking ring of the breech lock coupling; and
the at least one fastener is configured to selectively apply the pre-load force to the removable locking ring for selectively pre-loading the first and second coupling components with the removable locking ring of the breech lock coupling.

13. The system of claim 1, wherein the removable locking ring is coupleable to the first or second coupling component via a sequence of an axial movement followed by a rotational movement of the plurality of teeth of the removable locking ring relative to the plurality of mating teeth of the first or second coupling component.

14. The system of claim 1, wherein the removable locking ring is configured to secure the first and second coupling components together without pre-loading, and the at least one fastener is configured to selectively apply a pre-load force to the removable locking ring.

15. The system of claim 1, wherein the first plurality of teeth of the first row extend to a first radius, the second plurality of teeth of the second row extend to a second radius, and the first and second radii are different from one another.

16. The system of claim 1, wherein the plurality of teeth of the removable locking ring comprises the first row, the second row, and a third row axially offset from one another relative to the axis, the third row comprises a third plurality of teeth spaced apart from one another circumferentially about the axis via a third plurality of indentions, and the third plurality of teeth circumferentially overlap with the second plurality of indentions.

17. A system, comprising:
a breech lock coupling, comprising:
a first coupling component comprising a first plurality of rings protruding radially outward from a first coupling end;
a second coupling component comprising a first plurality of ring segments arranged in an alternating configuration protruding radially outward from a second coupling end;
a removable locking ring configured to secure the first and second coupling components together, wherein the removable locking ring comprises:
first and second ring portions circumferentially spaced about an axis of the breech lock coupling;
a second plurality of rings protruding radially inward and configured to cooperate with the first plurality of rings; and
a second plurality of ring segments arranged in an alternating configuration protruding radially inward and configured to cooperate with the first plurality of ring segments, wherein the removable locking ring is coupleable to the second coupling component via insertion of the second coupling end of the second coupling component into the removable locking ring followed by rotation of the removable locking ring with respect to the second coupling component; and
a plurality of fasteners extending crosswise to the axis and coupling the first and second ring portions, wherein the plurality of fasteners is configured to tighten the removable locking ring around the first and second coupling components to provide a pre-load force to the removable locking ring for selectively pre-loading the first and second coupling components with the removable locking ring of the breech lock coupling.

18. A mineral extraction system, comprising:
a breech lock coupling, comprising:
a removable locking ring comprising a first coupling section axially offset from a second coupling section, wherein the first coupling section comprises at least one substantially continuous tooth extending circumferentially about an axis of the breech lock coupling on the removable locking ring, wherein the second coupling section comprises at least one segmented tooth having alternating protrusions and indentions disposed circumferentially about the axis of the breech lock coupling on the removable locking ring, wherein the removable locking ring is circumferentially split via at least one circumferential break extending along an entire length of the removable locking ring through the first and second coupling sections.

19. The mineral extraction system of claim 18, wherein the breech lock coupling comprises:
a first coupling component secured to a first end of a first riser section and comprising a plurality of rows of continuous teeth protruding radially therefrom;

a second coupling component secured to a second end of a second riser section and comprising a plurality of rows of staggered teeth protruding radially therefrom; and the removable locking ring comprising:

the first coupling section comprising a plurality of rows of continuous teeth protruding radially from the removable locking ring and configured to cooperate with the plurality of rows of continuous teeth of the first coupling component;

the second coupling section comprising a plurality of rows of staggered teeth protruding radially from the removable locking ring and configured to cooperate with the plurality of rows of staggered teeth of the second coupling component; and a plurality of fasteners configured to selectively apply a pre-load force to the removable locking ring for selectively pre-loading the first and second coupling components with the removable locking ring of the breech lock coupling.

20. The mineral extraction system of claim 18, wherein the breech lock coupling comprises first and second coupling components coupled together via the removable locking ring, wherein the first coupling component comprises at least one first mating tooth coupled with the at least one substantially continuous tooth of the first coupling section, and the second coupling component comprises at least one second mating tooth coupled with the at least one segmented tooth of the second coupling section.

21. The mineral extraction system of claim 18, wherein the first coupling section comprises a plurality of rows of substantially continuous teeth extending circumferentially about the axis of the breech lock coupling on the removable locking ring, and the second coupling section comprises a plurality of rows of segmented teeth having alternating protrusions and indentions disposed circumferentially about the axis of the breech lock coupling on the removable locking ring.

22. The mineral extraction system of claim 18, wherein the second coupling section comprises a plurality of rows of segmented teeth having alternating protrusions and indentions disposed circumferentially about the axis of the breech lock coupling on the removable locking ring, wherein the protrusions and the indentions are staggered from one row to another among the plurality of rows on the removable locking ring.

23. The mineral extraction system of claim 18, wherein the removable locking ring is circumferentially split into first and second ring portions via the at least one circumferential break extending along the entire length of the removable locking ring, wherein the at least one substantially continuous tooth of the first coupling section is disposed on the first and second ring portions, and wherein the at least one segmented tooth of the second coupling section is disposed on the first and second ring portions.

24. The mineral extraction system of claim 18, wherein the breech lock coupling comprises a plurality of external tube supports spaced circumferentially about the axis of the breech lock coupling.

25. The mineral extraction system of claim 24, wherein the plurality of external tube supports are separate from one another, and each of the plurality of external tube supports is coupled to the breech lock coupling adjacent a load bearing shoulder configured to bear a load of an external tube in an axial direction.

26. The mineral extraction system of claim 25, wherein each of the plurality of external tube supports is coupled to the breech lock coupling via one or more radial fasteners.

27. The mineral extraction system of claim 25, wherein each of the plurality of external tube supports has an internal bore having a first bore portion with a first diameter, a second bore portion with a second diameter different than the first diameter, and a shoulder axially between the first and second bore portions.

28. A system, comprising:

a breech lock coupling, comprising:

a first coupling component configured to couple to a first end portion of a first tubing, wherein the first coupling component comprises first teeth;

a second coupling component configured to couple to a second end portion of a second tubing, wherein the second coupling component comprises second teeth;

a removable locking ring, comprising:

first and second ring portions circumferentially spaced about an axis of the breech lock coupling, a first coupling section comprising first mating teeth configured to engage with the first teeth of the first coupling component to provide a first teeth connection, wherein the first teeth or the first mating teeth comprise a first row and a second row axially offset from one another relative to the axis, the first row comprises a first plurality of teeth spaced apart from one another circumferentially about the axis via a first plurality of indentions, the second row comprises a second plurality of teeth spaced apart from one another circumferentially about the axis via a second plurality of indentions, the first plurality of teeth circumferentially overlap with the second plurality of indentions, and the second plurality of teeth circumferentially overlap with the first plurality of indentions;

a second coupling section comprising second mating teeth configured to engage with the second teeth of the second coupling component to provide a second teeth connection, wherein the breech lock coupling is configured to secure the first and second coupling components together;

one or more first threaded fasteners selectively coupling the first and second ring portions together at a first circumferential split between the first and second ring portions.

29. The system of claim 28, comprising the first tubing having the first coupling component fixed to the first end portion of the first tubing, and the second tubing having the second coupling component fixed to the second end portion of the second tubing.

30. The system of claim 28, wherein the first coupling component comprises a first weld interface configured to fixedly connect with the first end portion of the first tubing, and the second coupling component comprises a second weld interface configured to fixedly connect with the second end portion of the second tubing.

31. The system of claim 28, comprising one or more second threaded fasteners selectively coupling the first and second ring portions together at a second circumferential split between the first and second ring portions.

32. The system of claim 31, wherein the breech lock coupling is configured to secure the first and second coupling components together without pre-loading of the first teeth connection and the second teeth connection, wherein the one or more first and second threaded fasteners are configured to selectively apply a pre-load force to the removable locking ring.

33. The system of claim 31, comprising a plurality of the first threaded fasteners selectively coupling the first and second ring portions together at the first circumferential split between the first and second ring portions, and a plurality of the second threaded fasteners selectively coupling the first and second ring portions together at the second circumferential split between the first and second ring portions.

34. The system of claim 28, wherein the breech lock coupling comprises a plurality of external tube supports configured to support a plurality of external tubes lengthwise along the first and second tubing, and the plurality of external tube supports is configured to enable load sharing between the plurality of external tubes and the first and second tubing.

35. The system of claim 28, wherein the first tubing comprises a first riser section and the second tubing comprises a second riser section.

36. The system of claim 28, wherein the breech lock coupling is configured to secure the first and second coupling components together without pre-loading of the first teeth connection and the second teeth connection, wherein the one or more first threaded fasteners are configured to selectively apply a pre-load force to the removable locking ring.

37. The system of claim 28, wherein the first plurality of teeth of the first row extend to a first radius, the second plurality of teeth of the second row extend to a second radius, and the first and second radii are different from one another.

38. The system of claim 28, wherein the first teeth or the first mating teeth comprise the first row, the second row, and a third row axially offset from one another relative to the axis, the third row comprises a third plurality of teeth spaced apart from one another circumferentially about the axis via a third plurality of indentions, and the third plurality of teeth circumferentially overlap with the second plurality of indentions.

* * * * *